Patented Oct. 20, 1953

2,656,356

UNITED STATES PATENT OFFICE 2,656,356

6-PHENOXYMETHYLPTERIDINES

David I. Weisblat and Barney J. Magerlein, Kalamazoo, Mich., assignors to The Upjohn Company, Kalamazoo, Mich., a corporation of Michigan No Drawing. Application February 24, 1951, Serial No. 212,668

11 Claims. (Cl. 260—251.5)

This invention relates to 6-phenoxymethylpteridines, and to a method for their preparation. Among the 6-phenoxymethylpteridines of this invention are those represented by the formula:

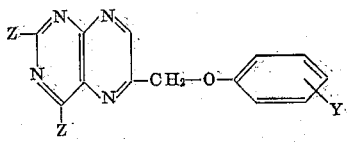

wherein each Z is a member of the group consisting of hydrogen, hydroxyl, sulfhydryl, amino, halogen and alkyl and Y is a member of the group consisting of hydrogen, nitro, amino, halogen, alkyl, hydroxyl, alkoxyl, sulfonic acid, carboxylic acid, and esters and amides of the sulfonic acid and carboxylic acid groups.

The pteridines of this invention are yellow to brown solids, soluble in aqueous alkalies and acids, sparingly soluble in water and relatively insoluble in most common organic solvents. They char and decompose without definite melting when heated above 300 degrees centigrade and are best characterized by their ultraviolet absorption spectra. They are useful as folic acid antagonists, differing from many other products which are folic acid antagonists in that their action is reversed, usually quantitatively, by the administration of a further quantity of folic acid. They are also useful as anti-viral agents and as enzyme inhibitors.

The preparation of 6-phenoxymethylpteridines is accomplished by contacting in solution a 4,5-diaminopyrimidine and a 3-phenoxy-2-ketopropylacetal, heating the solution to complete the reaction, cooling and recovering the 6-phenoxymethylpteridine thus obtained. The preparation of these pteridines is illustrated by means of the following diagram:

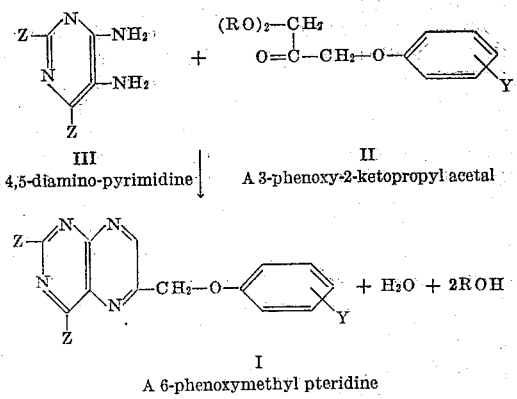

wherein R represents a lower alkyl radical and Y and Z have the values already given.

A preferred method for carrying out the synthesis of 6-phenoxymethylpteridines comprises dissolving the 3-phenoxy-2-ketopropylacetal in glacial acetic acid and adding this solution to a water solution of the 4,5-diaminopyrimidine. The solution of the 4,5-diaminopyrimidine is preferably prepared, just prior to use, by the neutralization of a water solution of an acid addition salt of the 4,5-diaminopyrimidine, such as the dihydrochloride or sulfate, by means of an alkali metal salt of a weak acid, such as sodium acetate, sodium carbonate, sodium bicarbonate and the like with sodium acetate being preferred.

The preparation of the free pyrimidine bases in this manner is desirable because of their instability and lack of keeping quality in storage, the acid addition salts being much superior in this respect. It is also advantageous to carry out the condensation in the absence of light and in a neutral, non-oxidizing atmosphere such as is provided by nitrogen, methane, ethane and the like. After mixing the reagents the mixture is heated for about thirty minutes to two hours to complete the reaction after which the mixture is cooled and the 6-phenoxymethylpteridine which separates is collected washed and dried. It can be purified further if desired by dissolving it in acid or alkali followed by dilution or neutralization and collecting the pteridine which precipitates.

The preparation of the required 3-phenoxy-2-ketopropylacetals can be accomplished by oxidizing the corresponding 3-phenoxy-2-hydroxypropylacetal as illustrated below

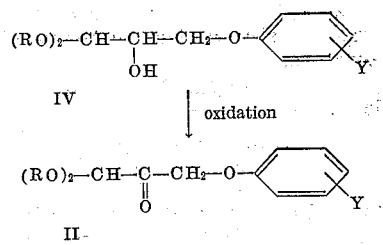

wherein R and Y have the values previously assigned. This oxidation can be accomplished by those known methods for oxidizing secondary alcohols to ketones which are conducted under such mild reaction conditions that the acetal will not be hydrolyzed to the aldehyde. When the oxidation is carried out under acid conditions, such as those resulting from the use of aqueous sodium dichromate and sulfuric acid, it is particularly desirable to conduct the oxidation at temperatures below room temperature, preferably between about zero and about five degrees centigrade in order to avoid hydrolysis of the acetal. While a dichromate in acid solution is a preferred oxidizing agent, a permanganate, or other like oxidizing agents can be used. For reasons that will be apparent hereinafter when Y is a carboxyl or a sulfonic acid group, preparation of the keto-acetal is preferably accomplished by hydrolysis of the corresponding sulfonic or carboxylic acid ester as it is difficult, if not impossible, to obtain the hydroxyacetal required for the oxidation step. When Y represents $NH_2$ it is preferred that the keto acetal be obtained by reduction of the compound wherein Y represents $NO_2$ as amino-benzenes are subject to attack by strong oxidizing agents.

Those hydroxyacetals wherein Y is not a free carboxylic acid or sulfonic acid can be obtained by the condensation of a 1,2-epoxy propionaldehyde dialkylacetal with a hydroxy benzene compound according to the equation:

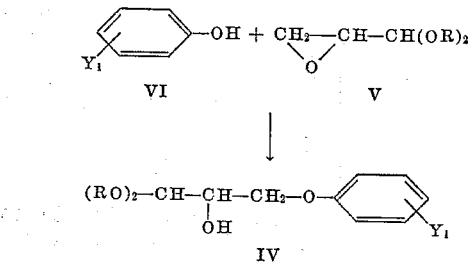

wherein R has the value previously assigned and $Y_1$ is a member of the group consisting of hydrogen, amino, halogen, hydroxyl, alkoxyl, alkyl, carboxylic acid esters, carboxylic acid amides, sulfonic acid esters, and sulfonic acid amides, differing from Y in that carboxylic acids and sulfonic acids are excluded for reasons previously mentioned.

The compounds

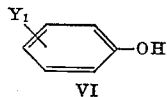

such as phenol, halogenated phenols, alkoxyphenols, aminophenols, alkylphenols, nitrophenols, hydroxybenzoic acid esters, hydroxybenzamides, hydroxysulfonic acid esters and hydroxysulfonamides which are suitable for use in processes of this invention are well known and characterized chemical compounds which can be obtained either in the open market or prepared according to methods given in the readily available literature.

The 2,3-oxidopropanyl acetals having the formula

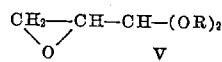

wherein R has the values previously assigned can be prepared from the corresponding acrolein acetals, $CH_2=CH-CH(OR)_2$, by the addition of hypochlorous acid (HOCl) to give a 2-hydroxy-3-chloro acetal,

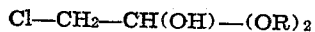

followed by cyclization using alkali to give the desired oxido-acetals according to methods described in the art. Dialkylacetals of 1,2-oxidopropanal which can be used in the process include the dimethyl, diethyl, di-n-propyl, di-iso-propyl, dibutyl, diamyl and other dialkyl acetals. As a matter of convenience and availability dialkylacetals wherein the alkyl radicals each contain less than 8 carbon atoms are preferred, although others can be used if desired. It is apparent that the nature of the alkyl groups in the 3,3-dialkyl-2-hydroxy propyl and in the 3,3-dialkyl-2-keto-propyl radicals of the intermediate Compounds II and IV are determined by the particular 1,2-oxidopropanyl dialkylacetal used in the first step of the process.

The following examples which illustrate this invention are subject to variations readily appreciated by those skilled in the art to which this invention pertains.

PREPARATION 1.—ETHYL-P(2-HYDROXY-3,3-DIETHOXY-PROPOXY)BENZOATE

A clear solution of 292 grams of 2,3-oxidopropanyl diethylacetal and 332 grams of ethyl-para-hydroxybenzoate was prepared by melting the ethyl para-hydroxybenzoate at 130 degrees centigrade adding the oxidopropanyl acetal and stirring the solution for about five minutes. To the clear solution thus prepared 0.5 milliliter of pyridine was added and the temperature of the reaction mixture raised gradually to about 158 degrees centigrade over a period of about 15 minutes. An additional 0.5 milliliter of pyridine was added whereupon the reaction temperature rose rapidly to 175 degrees centigrade. The reaction temperature was then reduced to about 155 degrees centigrade by external cooling and was maintained at 155–160 degrees centigrade for an additional 90 minutes. The mixture was then cooled to room temperature and dissolved in 500 milliliters of ether. The organic solution was washed twice with 500-milliliter portions of water and twice with 250-milliliter portions of 3 percent sodium hydroxide solution and then twice more with water. The organic layer was dried by shaking it with 250 milliliters of saturated sodium chloride solution separating the organic layer and filtering it through a bed of anhydrous sodium sulfate. The ether was removed and the residual oil distilled under reduced pressure. There was obtained 460 grams of a yellow oil distilling between 171 and 175 degrees centigrade at a pressure of 0.6 millimeter of mercury which, after crystallization from commercial hexane, gave ethyl-p-(2-hydroxy-3,3-diethoxypropoxy)-benzoate as a white crystalline solid melting at 30–33.5 degrees centigrade.

In a like manner from 2,3-oxidopropanyl dibutyl acetal and butyl-p-hydroxybenzoate, butyl - (p - 2 - hydroxy - 3,3 - dibutoxypropoxy) benzoate is obtained. Likewise from 2,3-oxidopropanyl diethyl acetal and p-amino-phenol, para - (2 - hydroxy - 3,3 - diethoxypropoxy) aminobenzene is obtained; from 2,3-oxidopropanyl dibutyl acetal and ortho chlorophenol, ortho-(2-hydroxy-3,3-dibutoxypropoxy) chlorobenzene is obtained; from 2,3-oxido-propanyl dipropylacetal and p-bromobenzene, para-(2-hydroxy-3,3-dipropoxypropoxy) bromobenzene is obtained; from 2,3-oxidopropanyldiethyl acetal and p-nitrophenol, para - (2 - hydroxy - 3,3 - diethoxy-propoxy)-nitrobenzene is obtained; from p-ethylphenol and 2,3-oxidopropanyldiethylacetal, para-(2-hydroxy - 3,3 - diethoxypropoxy) ethyl benzene is obtained, from hydroquinone monoethyl ether and 2,3-oxidopropanyl diethylacetal, para (2-hydroxy-3,3-diethoxypropoxy)-ethoxybenzene is obtained; from p-hydroxybenzamide and 2,3-oxidopropanyldibutyl acetal, p-(2-hydroxy-3,3-dibutoxypropoxy) benzamide is obtained; from ethyl-p-hydroxybenzene sulfonate and 2,3-oxido-propanyl diethylacetal, ethyl - p - (2-hydroxy - 3,3 - diethoxypropoxy) benzene sulfonate is obtained.

PREPARATION 2.—ETHYL-P-(2-KETO-3,3-DIETHOXY-PROPOXY)BENZOATE

A solution of 275 grams of sodium dichromate dihydrate dissolved in a mixture of 1210 milliliters of water and 361 milliliters of concentrated sulfuric acid was cooled to about 5 degrees centigrade and added to a solution of 163 grams of ethyl-p-(2-hydroxy-3,3-diethoxypropoxy)benzoate dissolved in two liters of chlorobenzene at such a rate that the temperature of the reaction mixture with the help of external cooling was maintained between about 5 and about 8 degrees centigrade during the addition. At the end of about an hour, one liter of benzene was added to the reaction mixture and the organic layer separated. The aqueous layer was extracted twice with 500-milliliter portions of benzene. The combined benzene layers were washed once with 1500 milliliters of water and twice with 1500-milliliter portions of 50 percent saturated sodium chloride solution. The organic layer was dried by shaking it with saturated sodium chloride solution, separating the organic layer stirring it with anhydrous sodium sulfate and filtering. The solvent was removed and the residual oil distilled under reduced pressure. There was thus obtained 123 grams of ethyl - p - (2 - keto - 3,3 - diethoxypropoxy) benzoate as a yellow oil, $N_D^{21}=1.5058$.

In a like manner, the oxidation of butyl-p-(2-hydroxy-3,3-dibutoxypropoxy)benzoate gives butyl - p - (2 - keto - 3,3 - dibutoxypropoxy)benzoate; the oxidation of p-(2-hydroxy-3,3-diethoxypropoxy)nitrobenzene gives p-(2-keto-3,3-diethoxypropoxy) nitrobenzene which on reduction gives p-(2-keto-3,3-diethoxypropoxy) aminobenzene; the oxidation of ortho-(2-hydroxy-3,3-dibutoxypropoxy)chloro benzene gives ortho - (2 - keto - 3,3 - dibutoxypropoxy) - chlorobenzene; the oxidation of p-(2-hydroxy-3,3-dipropoxy-propoxy)-bromobenzene gives p-(2 - keto - 3,3 - dipropoxypropoxy) - bromobenzene; the oxidation of p-(2-hydroxy-3,3-diethoxypropoxy) ethylbenzene gives p-(2-keto-3,3-diethoxypropoxy) ethyl benzene; the oxidation of p-(2-hydroxy-3,3-diethoxy propoxy) ethoxy benzene gives p-(2-keto-3,3-diethoxypropoxy) ethoxybenzene; the oxidation of p-(2-hydroxy-3,3-dibutoxypropoxy) benzamide gives p-(2-keto-3,3-dibutoxy propoxy) benzamide and the oxidation of ethyl-p-(2-hydroxy-3,3-diethoxypropoxy)benzene sulfonate gives ethyl-p-(2-keto-3,3-diethoxypropoxy) benzene sulfonate.

The saponification of ethyl-p-(2-keto-3,3-diethoxy propoxybenzoate) followed by careful neutralization gives p-(2-keto-3,3-diethoxypropoxy) benzoic acid.

*Example 1.—Ethyl-4-{[-(2-amino-4-hydroxy-6-pyrimido-.[4,5-b] -pyrazyl)-methoxy] -oxy}-benzoate also called 2-amino-4-hydroxy-6-(p-carbethoxyphenoxy)-methyl pteridine*

A solution of 0.8 gram of ethyl-p-(2-keto-3,3-diethoxypropoxy)benzoate in 14.8 milliliters of glacial acetic acid was added to a mixture of 0.42 gram of sodium acetate and 0.55 gram of 2,4,5-triamino-6-hydroxy pyrimidine dihydrochloride. The mixture was stirred for thirty minutes at room temperature in the dark under an atmosphere of nitrogen then heated to 118-120 degrees and stirred for an additional twenty minutes. The mixture was cooled to about zero degrees centigrade and the dark colored precipitate which had separated was collected. After washing twice with water and once with acetone and drying there was obtained 0.58 gram of 2-amino-4-hydroxy-6-(p-carbethoxyphenyl)-methylpteridine.

The condensation, in a like manner using glacial acetic acid as a solvent, of butyl-p-(2-keto-3,3-dibutoxypropoxy)benzoate and 2,4,5-triamino-6-hydroxypyrimidine gives 2- amino - 4 - hydroxy-6-(p-carbobutoxyphenoxy) methyl pteridine. Similarly the condensation of ethyl-p-(2-keto-3,3-diethoxypropoxy)benzoate and 2,4,5,6-tetraaminopyrimidine gives 2,4-diamino-6-(p-carbethoxyphenoxy)-methylpteridine; the condensation of ethyl-p-(2-keto - 3,3 - diethoxypropoxy)benzoate and 4,5,6-triaminopyrimidine gives 4-amino-6-(p - carbethoxyphenoxy)methylpteridine; the condensation of ethyl-p-(2-keto-3,3-diethoxypropoxy) benzoate and 4,5,6-triamino-2-methyl-thiol pyrimidine gives 2-methylthiol-4-amino - 6 - (p - carbethoxyphenoxy)-methylpteridine; the condensation of ethyl-p-(2-keto-3,3-diethoxy propoxy) benzoate and 4,5,6-triamino-2-thiolpyrimidine gives 2-thiol-4-amino-6-(p-carbethoxyphenoxy)-methyl pteridine; the condensation of ethyl-p-(2-keto-3,3-diethoxy propoxy)-benzoate and 4,5,6-triamino-2-methylpyrimidine gives 2-methyl - 4 - amino-6-(p-carbethoxyphenoxy)-methylpteridine; the condensation of ethyl-p-(2-keto-3,3 - diethoxypropoxy)benzoate and 4,5-diaminopyrimidine gives 6-(p-carbethoxyphenoxy)-methylpteridine; the condensation of 2-methyl - 4,5 - diamino-6-hydroxypyrimidine and ethyl - (2 - keto - 3,3 - diethoxypropoxy)benzoate gives 2-methyl-4-hydroxy-6-(p - carbethoxyphenoxy)-methyl-pteridine; the condensation of 4,5-diamino-2-chloropyrimidine and ethyl-p-(2-keto-3,3-diethoxypropoxy)-benzoate gives 2-chloro-6-(p-carbethoxyphenoxy)methylpteridine; the condensation of 2,6-dihydroxy-4,5-diamino-pteridine and ethyl-p - (2-keto-3,3-diethoxypropoxy) - benzoate gives 2,4-dihydroxy-6-(p - carbethoxyphenoxy)methylpteridine; the condensation of 2-ethylthiol-4,5-diamino - 6 - hydroxypyrimidine and ethyl-p-(2-keto - 3,3 - diethoxypropoxy)benzoate gives 2-ethylthiol-4-hydroxy-6-(p - carbethoxyphenoxy)methyl-pteridine; the condensation of 2,6-dimethyl-4,5-diaminopyrimidine and ethyl-p-(2-keto-3,3-diethoxypropoxy)benzoate gives 2,4-dimethyl-6-(p-carbethoxyphenoxy) methylpteridine; the condensation of 2-chloro-4,5-diamino-6-ethylpyrimidine and ethyl p-(2-keto-3,3-diethoxypropoxy) benzoate gives 2-chloro-4-ethyl-6 - (p - carbethoxyphenoxy)methylpteridine; the condensation of 2-thiol-4,5-diamino-6-hydroxypyrimidine and ethyl-p-(2-keto-3,3-diethoxypropoxy) benzoate gives 2-thiol-4-hydroxy-6-(p-carbethoxyphenoxy) methylpteridine; the condensation of 4,5 - diamino - 6 - methylpyrimidine and ethyl-p-(2-keto-3,3-diethoxypropoxy)benzoate gives 4-methyl-6-(p - carbethoxyphenoxy)-methylpteridine; the condensation of 2,4,5-triaminopyridine and ethyl p-(2-keto-3,3-diethoxypropoxyphenoxy)methylpteridine; gives 2-amino-6 - (p - carbethoxyphenoxy)methylpteridine; the condensation of 2,4,5 - triamino - 6 - chloropyrimidine and ethyl-p-(2-keto - 3,3 - diethoxypropoxy)benzoate gives 2 - amino - 4 - chloro - 6-(p-carbethoxyphenoxy)methylpteridine and the condensation of 2,4,5-triamino-6-methylpyrimidine gives 2-amino-4-methyl-6-(p-carbethoxyphenoxy)methylpteridine.

Likewise the condensation of p-2-keto-3,3-diethoxypropoxybenzoic acid with 2,4,5-triamino-6-hydroxypyrimidine in glacial acetic acid gives 2-amino-4-hydroxy-6-(p-carboxyphenoxy)methylpteridine and the condensation of 2,4,5-triamino-6-hydroxy pyrimidine and p-(2-keto-3,3-diethoxypropoxy)-benzene sulfonic acid gives 2-amino-4-hydroxy-6-(p-oxybenzenesulfonic acid) methylpteridine although the preferred method of preparing these compounds having free carboxy and sulfonic acid groups is by the hydrolysis of esters such as are described above according to the procedure given in Example 2.

Likewise the condensation of 4,5,6-triamino-pyrimidine and p-(2-keto-3,3-diethoxypropoxy)nitro benzene gives 4-amino-6-(p-nitrophenoxy) methylpteridine; the condensation of p-(2-keto-3,3'-diethoxypropoxy)amino-benzene with 2-methylthiol-4,5,6-triaminopyrimidine gives 2-methylthiol-4-amino-6-(p-aminophenoxy)-methylpteridine; the condensation of 2-thiol-4,5,6-triaminopyrimidine and ortho-(2-keto-3,3-dibutoxypropoxy)chloro-benzene gives 2-thiol-4-amino-6-(ortho-chlorophenoxy)-methylpteridine; the condensation of 2-methyl-4,5,6-triamino pyrimidine and p-(2-keto-3,3-dipropoxy)-bromobenzene gives 2-methyl-4-amino-6-(p-bromophenoxy) methylpteridine; the condensation of 2,4,5,6-tetraaminopyrimidine and p-(2-keto-3,3-diethoxypropoxy)ethyl benzene gives 2,4-diamino-6-(p-ethylphenoxy)methylpteridine; the condensation of 2,6-dihydroxy-4,5-diamino-pyrimidine with p-(2-keto-3,3-dibutoxy-propoxy)-benzamide gives 2,4-dihydroxy-6-(p-carbamidophenoxy)methylpteridine.

*Example 2. — 2-amino-4-hydroxy-6-(p-carboxyphenoxy)-methylpteridine*

The 2-amino-4-hydroxy-6-(p-carbethoxyphenoxy)-methylpteridine from Example 1 was dissolved in ten percent sodium hydroxide solution and after standing for one hour at room temperature, the pH was adjusted to 3.0. There was thus obtained 0.49 gram of crude pteridine which was further purified by solution in 100 milliliters of one normal sodium hydroxide and dilution to 500 milliliters. To this solution was added calcium hydroxide solution and the mixture stirred at room temperature in the dark for 90 minutes, filtered, the filtrate heated to boiling, filtered, reheated to boiling and the pH adjusted to 3.0 with concentrated hydrochloric acid. A yellow precipitate separated which was collected and dried under vacuum to give 2-amino-4-hydroxy-6-(p-carboxyphenoxy)-methylpteridine whose ultraviolet absorption spectra gave the following data:

| Peak (mμ) | Opt. Density | $E_{1\ cm.}^{1\%}$ |
|---|---|---|
| 257 | 2.311 | 1,114 |
| 363 | 0.542 | 267 |

*Analysis.*—Calculated for $C_{14}H_{11}O_4N_5$: C, 53.67; H, 3.54; N, 22.35. Found: C, 54.21; H, 3.73; N, 22.48.

When hydrolyzed in a like manner, by means of alkali at room temperature, 2-amino-4-hydroxy-6-(p-carbobutoxyphenoxy)methylpteridine gives 2-amino-4-hydroxy-6-(p-carboxyphenoxy)-methylpteridine; 2,4-diamino-6-(p-carbethoxyphenoxy)methylpteridine gives 2,4-diamino-6-(p-carboxy-phenoxy)methylpteridine; 4-amino-6-(p-carbethoxyphenoxy)methylpteridine gives 4-amino-6-(p-carboxyphenoxy)methylpteridine; 2-methylthiol-4-amino-6-(p-carbethoxyphenoxy)methylpteridine gives 2-methylthiol-4-amino-6-(p-carboxyphenoxy)methylpteridine; 2-thiol-4-amino-6-(p-carbethoxyphenoxy)methylpteridine gives 2-thiol-4-amino-6-(p-carboxyphenoxy)methylpteridine; 2-methyl-4-amino-6-(p-carbethoxyphenoxy)methylpteridine gives 2-methyl-4-amino-6-(p-carboxyphenoxy)-methylpteridine; 6-(p-carbethoxyphenoxy)-methylpteridine gives 6-(p-carboxyphenoxy)methylpteridine; 2-methyl-4-hydroxy-6-(p-carbethoxyphenoxy)methylpteridine gives 2-methyl-4-hydroxy-(p-carboxyphenoxy)methylpteridine; 2-chloro-6-(p-carbethoxyphenoxy)methylpteridine gives 2-chloro-6-(p-carboxyphenoxy)methylpteridine; 2,4-dihydroxy-6-(p-carbethoxyphenoxy)methylpteridine gives 2,4-dihydroxy-6-(p-carboxyphenoxy)methylpteridine; 2-ethylthiol-4-amino-6-(p-carbethoxypropoxy)methylpteridine gives 2-ethyl-thiol-4-amino-6-(p-carboxyphenoxy)-methylpteridine; 2,4-dimethyl-6-(p-carbethoxyphenoxy)-methylpteridine gives 2,4-dimethyl-6-(p-carboxyphenoxy)methylpteridine; 2-chloro-4-ethyl-6-(p-carbethoxyphenoxy)methylpteridine gives 2-chloro-4-ethyl-6-(p-carboxyphenoxy)-methylpteridine; 2-thiol-4-hydroxy-6-(p-carbethoxyphenoxy)methylpteridine gives 2-thiol-4-hydroxy-6-(p-carboxyphenoxy)methylpteridine; 4-methyl-6-(p-carbethoxyphenoxy)methylpteridine gives 4-methyl-6-(p-carboxyphenoxy)methylpteridine; 2-amino-6-(p-carbethoxyphenoxy)-methylpteridine gives 2-amino-6-(p-carboxyphenoxy)methylpteridine; 2-amino-4-chloro-6-(p-carbethoxyphenoxy)methylpteridine gives 2-amino-4-chloro-6-(p-carboxyphenoxy)methylpteridine; and 2-amino-4-methyl-6-(p-carbethoxyphenoxy)methylpteridine gives 2-amino-4-methyl-6-(p-carboxyphenoxy)-methylpteridine.

PREPARATION 3.—DIETHYL P-ACETOXYBENZOYL-L-GLUTAMATE

Fifty milliliters of toluene was distilled from a solution of 18 grams of p-acetoxybenzoic acid in 300 milliliters of toluene to remove any water from the solution. The solution was then cooled to about 45 degrees centigrade and 2 drops of pyridine was added followed by 54 milliliters of thionyl chloride in two equal portions. After about one-half hour the temperature of the reaction mixture had risen to 58 degrees centigrade and a clear solution formed. The mixture was maintained at 50 degrees centigrade with stirring for an additional four hours, whereupon the excess thionyl chloride and the toluene were removed by distillation under reduced pressure. The residual yellow p-acetoxybenzoyl chloride was dissolved in 140 milliliters of ethylene dichloride and to it was added solution of 24 grams of diethyl-L-glutamate hydrochloride in 50 milliliters of ethylene dichloride. The resulting solution was stirred and cooled to 15 degrees centigrade and to it was added 22.2 grams of triethyl amine at such a rate that the temperature of the cooled reaction mixture was kept below about 20 degree centigrade. After the addition of the triethyl amine was complete and the exothermic reaction had subsided, the solution was stirred for an additional hour at room temperature. The reaction product was recovered by washing the solution twice with 50-milliliter portions of water, once with 50 milliliters of 2-normal HCl, twice with 50-milliliter portions of saturated sodium bicarbonate solution and finally with two 50-milliliter portions of water, drying the organic layer, removing the solvent and distilling the residue under reduced pressure. There was thus obtained 33.1 grams of diethyl p-acetoxybenzoyl- L-glutamate melting at 74–76.5 degrees centigrade.

*Analysis.*—Calculated for $C_{18}H_{23}O_7N$: C, 59.16; H, 6.34; N, 3.83. Found: C, 59.12; H, 6.34; N, 3.90.

In a similar manner p-acetoxybenzene sulfonic acid and dibutyl-L-glutamate gives dibutyl-p-acetoxybenzene sulfonyl-L-glutamic acid.

PREPARATION 4.—DIETHYL P-HYDROXYBENZOYL-L-GLUTAMATE

Ten grams diethyl p-acetoxybenzoyl-L-glutamate from Preparation 3 was dissolved in 200 milliliters of absolute ethanol and to the solution was added 3.0 grams of p-toluenesulfonic acid monohydrate. The solution was heated under gentle reflux for about 40 minutes and then ethanol was distilled slowly from it for about five hours. At this time the remaining ethanol was removed rapidly and the residue dissolved in ethyl acetate. The ethyl acetate solution was washed well with water and sodium bicarbonate solution, dried and concentrated under reduced pressure. There was thus obtained 8.2 grams of diethyl-p-hydroxybenzoyl-L-glutamate melting at 79 to 85 degrees centigrade $[\alpha]_D = -14.4$ degrees.

In a similar manner the selective hydrolysis of diethyl - p - acetoxybenzene sulfonyl - L - glutamate gives diethyl - p - hydroxybenzenesulfonyl-L-glutamate.

PREPARATION 5.—DIETHYL-P-(2-HYDROXY-3,3-DIETHOXYPROPOXY)BENZOYL-L-GLUTAMATE

To 3.23 grams of diethyl p-hydroxybenzoyl-L-glutamate, heated to above its melting point, 1.75 grams of 2,3-oxidopropanyl diethylacetal and three drops of pyridine were added. The temperature of the mixture was raised first, to about 130–135 degrees centigrade and then gradually to 143 degrees centigrade where it was maintained for about two hours and then cooled to room temperature. The diethyl-p-(2-hydroxy-3,3-diethoxypropoxy)benzoyl - L - glutamate thus obtained had an index of refraction $N_D^{25} = 1.5057$.

In a like manner dibutyl-p-hydroxybenzenesulfonyl-L-glutamate and 2,3-oxidopropanyl dibutylacetal when heated together in the presence of pyridine give dibutyl-p-(2-hydroxy-3,3-dibutoxypropoxy) benzenesulfonyl-L-glutamate.

PREPARATION 6.—DIETHYL-P-(2-KETO-3,3-DIETHOXYPROPOXY)BENZOYL-L-GLUTAMATE

A solution of the diethyl p-(2-hydroxy-3,3-diethoxypropoxy)benzoyl-L-glutamate from Preparation 5 in 38 milliliters of chlorobenzene was added with stirring to a solution of 5.3 grams of sodium dichromate dihydrate and 6.9 milliliters of concentrated sulfuric acid while maintaining the reaction temperature between about two and about six degrees centigrade during the addition of the glutamate and for an additional two hours. The chlorobenzene was diluted by the addition of benzene and the water layer separated. The water layer was extracted twice with 30-milliliter portions of benzene, the benzene extracts being combined. The combined benzene extracts were washed three times with water, once by shaking with saturated sodium chloride solution and dried by filtering through anhydrous sodium sulfate. The solvent was removed under reduced pressure and there was obtained 2.7 grams of diethyl p-(2-keto-3,3-diethoxypropoxy)benzoyl-L-glutamate as a yellow oil having an index of refraction $N_D^{41.5} = 1.5048$.

In a like manner the oxidation of dibutyl-p-(2 - hydroxy - 3,3 - dibutoxypropoxy)benzenesulfonyl-L-glutamate by sodium dichromate gives dibutyl - p - (2 - keto - 3,3 - dibutoxypropoxy)-benzenesulfonyl-L-glutamate.

The saponification under mild alkaline conditions of diethyl - p - (2 - keto - 3,3 - diethoxypropoxy)-benzoyl-L-glutamate gives p-(2-keto-3,3-diethoxypropoxy)-benzoyl-L-glutamic acid as the alkali metal salt. In a like manner the saponification with alkali of dibutyl-p-(2-keto-3,3 - dibutoxypropoxy)benzenesulfonyl - L - glutamate gives the alkali metal salt of p-(2-keto-3,3 - dibutoxypropoxy)benzenesulfonyl - L - glutamic acid.

*Example 3.* — *Diethyl N - [4 - { - [ - (2 - amino - 4 - hydroxy - 6 - pyrimido[4,5 - b]pyrazyl) - methyl] - oxy}benzoyl] - L - glutamate, also designated as 2 - amino - 4 - hydroxy - 6 - [para - N - (diethyl - α - glutarate) - carbamidophenoxy]-methylpteridine*

The 2.7 grams of diethyl - p - (2 - keto - 3,3-diethoxypropoxy)benzoyl - L - glutamate from Preparation 6 dissolved in 48 milliliters glacial acetic acid was added to a mixture of 1.38 grams of sodium acetate and 1.8 grams of 2,4,5-triamino - 6 - hydroxypyrimidine dihydrochloride. The mixture was stirred under nitrogen in the dark for thirty minutes at room temperature and then heated to about 105–110 degrees centigrade for an hour. The reaction mixture was cooled and the dark precipitate which had separated was collected, washed three times with water, dried and then washed with ethyl acetate. There was thus obtained 0.2 gram of diethyl-N-[4-{-[(2-amino - 4 - hydroxy - 6 - pyrimido - [4,5-b] - pyrazyl) - methyl] - oxy} - benzoyl] - L-glutamate (also called 2-amino-4-hydroxy-6-[para - N - (diethyl - α - glutarate) - carbamidophenoxy]methylpteridine) whose ultraviolet absorption curve showed the following properties.

| Peak (mµ) | Opt. Density | $E_{1\ cm.}^{1\%}$ |
|---|---|---|
| 258 | 1.285 | 642.5 |
| 366 | 0.355 | 177.5 |

An additional 1.37 grams of this product was obtained by concentrating the acetic acid solution from which the first crop of material was obtained and collecting the resulting precipitate, which after washing with water and ethyl acetate gave an analogous ultraviolet absorption curve.

When condensed in a like manner, 2,4,5-triamino - 6 - hydroxypyrimidine and para - (2-keto - 3,3 - diethoxypropoxy) - benzoyl - L - glutamic acid give 2 - amino - 4 - hydroxy - 6-[para - N - (diethyl - α - glutaric acid)carbamidophenoxy]methylpteridine and the condensation of 2,4,5 - triamino - 6 - hydroxypyrimidine and para - (2 - keto - 3,3 - dibutoxypropoxy) benzenesulfonyl-L-glutamic acid give 2-amino-4 - hydroxy - 6 - [para - N - (α - glutaric acid) sulfonamidophenoxy]methylpteridine, although the preferred method for the preparation of these acids is by the hydrolysis of their esters as is shown in Example 4.

In a like manner the condensation of 4,5,6-triaminopyrimidine and diethyl-p-(2-keto-3,3-diethoxypropoxy) - benzoyl - L - glutamate gives 4-amino - 6 - [para - N - (diethyl - α - glutarate) carbamidophenoxy]methylpteridine; the condensation of 4,5,6-triamino-2-methylmercaptopyrimidine and diethyl - p - (2-keto - 3,3 - diethoxypropoxy) - benzoyl - L - glutamate gives 2-methylmercapto - 4 - amino - 6 - [para - N - (diethyl - α - glutarate) carbamidophenoxy]methylpteridine; the condensation of 4,5,6-triamino-2-thiopyrimidine and diethyl p-(2-keto-3,3-diethoxypropoxy)benzoyl - L - glutamate gives 2-thio - 4 - amino - 6 - [para - N - (diethyl - α-glutarate) - carbamidophenoxy]methylpteridine; the condensation of 4,5,6 - triamino - 2 - methylpyrimidine and diethyl p - (2 - keto - 3,3 - diethoxypropoxy) - benzoyl - L - glutamate gives 2 - methyl - 4 - amino - 6 - [para - N - (diethyl - α - glutarate) carbamidophenoxy] - methylpteridine; the condensation of 2,4,5,6 - tetraaminopyrimidine and diethyl p - (2 - keto - 3,3 - diethoxypropoxy)benzoyl - L - glutamate gives 2,4 - diamino - 6 - [para - N - (diethyl - α - glutarate) - carbamidophenoxy]methylpteridine; the condensation of 4,5 - diaminopyrimidine and diethyl - p - (2 - keto - 3,3 - diethoxypropoxy) - benzoyl - L-glutamate gives 6 - [para - N - (diethyl - α - glutarate)carbamidophenoxy] - methylpteridine; the condensation of 4,5 - diamino - 6 - hydroxy-2 - methylpyrimidine and diethyl - p - (2 - keto-3,3 - diethoxypropoxy)benzoyl - L - glutamate gives 2 - methyl - 4 - hydroxy - 6 - [para - N - (diethyl - α - glutarate) carbamidophenoxy]methylpteridine; the condensation of 4,5 - diamino - 2- chloropyrimidine and diethyl - p - (2 - keto - 3,3-diethoxypropoxy) benzoyl - L - glutamate gives 2-chloro - 6 - [para - N - (diethyl - α - glutarate) - carbamidophenoxy]methylpteridine; the condensation of 4,5 - diamino - 2,6 - dihydroxy - pyrimidine and diethyl - p - (2 - keto - 3,3 - diethoxypropoxy) benzoyl - L - glutamate gives 2,4 - dihydroxy - 6 - [para - N - (diethyl - α - glutarate) - carbamidophenoxy]methylpteridine; the condensation of 4,5 - diamino - 2 - ethylmercapto - 6 - hydroxypyrimidine and diethyl p - (2 - keto - 3,3-diethoxypropoxy) benzoyl - L - glutamate gives 2 - ethylmercapto - 4 - hydroxy - 6 - [para - N - (diethyl - α - glutarate) carbamidophenoxy]methylpteridine; the condensation of 4,5 - diamino-2,6 - dimethylpyrimidine and diethyl - p - (2-keto - 3,3 - diethoxypropoxy) - benzoyl - L - glutamate gives 2,4 - dimethyl - 6 - [para - N(diethyl - α - glutarate) - carbamidophenoxy]methylpteridine; the condensation of 4,5 - diamino - 2 - chloro - 6 - ethylpyrimidine and diethyl - p - (2 - keto - 3,3 - diethoxypropoxy)benzoyl - L - glutamate gives 2 - chloro - 4 - ethyl-6 - [para - N - (diethyl - α - glutarate) carbamidophenoxy]methylpteridine; the condensation of 4,5 - diamino - 2 - thio - 6 - hydroxpyrimidine and diethyl - p - (2 - keto - 3,3 - diethoxypropoxy) - benzoyl - L - glutamate gives 2 - thio - 4 - hydroxy - 6 - [para - N - (diethyl - α - glutarate) - carbamidophenoxy] - methylpteridine; the condensation of 4,5 - diamino - 6 - methylpyrimidine and diethyl p - (2 - keto - 3,3 - diethoxypropoxy) - benzoyl - L - glutamate gives 4 - methyl 6 - [para-N - (diethyl - α - glutarate) - carbamidophenoxy]methylpteridine; the condensation of 2,4,5 - triaminopyrimidine and diethyl p - (2 - keto - 3,3 - diethoxypropoxy) - benzoyl - L - glutamate gives 2 - amino - 6 - [para - N - (diethyl - α - glutarate)carbamidophenoxy] - methylpteridine; the condensation of 2,4,5 - triamino - 6 - chloropyrimidine and diethyl - p - (2 - keto - 3,3 - diethoxypropoxy) - benzoyl - L - glutamate gives 2-amino - 4 - chloro - 6 - [para - N - (diethyl - α-glutarate) carbamidophenoxy] methylpteridine; and the condensation of 2,4,5 - triamino - 6 - methylpyrimidine and diethyl - p - (2 - keto - 3,3-diethoxypropoxy) - benzoyl - L - glutamate gives 2 - amino - 4 - methyl - 6 - [para - N - (diethyl - α - glutarate) - carbamidophenoxy]methylpteridine.

In a like manner the condensation of 4,5,6 - triamino - 2 - thio - pyrimidine and diethyl - p - (2-keto - 3,3 - dibutoxypropoxy)benzenesulfonyl - L-glutamate gives 2 - thio - 4 - amino - 6 - [para-N - (diethyl - α - glutarate) sulfonamidophenoxy] - methylpteridine; the condensation of 2,4,5,6-tetraaminopyrimidine and diethyl - p - (2 - keto-3,3 - dibutoxypropoxy)benzenesulfonyl - L - glutamate gives 2,4 - diamino - 6 - [para - N - (diethyl - α - glutarate) - sulfonamidophenoxy]methylpteridine; and the condensation of 4,5-diamino - 2,6 - dihydroxypyrimidine and diethyl-p - (2 - keto - 3,3 - dibutoxypropoxy)benzenesulfonyl - L - glutamate gives 2,4 - dihydroxy - 6-[para - N - (diethyl - α - glutarate) sulfonamidophenoxy]methylpteridine.

*Example 4. — N[4 - { - [2 - amino-4-hydroxy-6-pyrimido[4,5-b]pyrazyl) methyl]-oxy}benzoyl]-L-glutamic acid(oxopterin-G)*

A solution of 0.5 gram of the pteridine, from Example 3, was dissolved in 100 milliliters of 0.1 N sodium hydroxide and diluted with 2 liters of water. To this solution 0.5 gram of calcium hydroxide was added, the mixture stirred at room temperature for ninety minutes, then heated to boiling and filtered. The filtrate was reheated to boiling, the pH adjusted to 3.0 and cooled. The brown precipitate which separated was collected, washed with water and dried. There was thus obtained 0.24 gram of oxopterin G whose ultraviolet absorption showed peaks at 258 and 364 mu respectively, $$E^{1\%}_{1\,cm.}$$

being 855 and 185 respectively.

When hydrolyzed in a like manner 4-amino-6-[para - N - (diethyl - α - glutarate) carbamidophenoxy]methylpteridine gives 4 - amino - 6-[para - N - (α - glutaric acid) - carbamidophenoxy]methylpteridine; 2 - methylmercapto - 4-amino - 6 - [para - N - (diethyl - α - glutarate) carbamidophenoxy]methylpteridine gives 2-methylmercapto - 4 - amino - 6 - [para - N-(α-glutaric acid)carbamidophenoxy]methylpteridine; 2 - thio - 4 - amino - 6 - [para - N - (diethyl α - glutarate) carbamidophenoxy]methylpteridine gives 2 - thio - 4 - amino - 6 - [para - N - (α - glutaric acid)carbamidophenoxy]methylpteridine; 2 - methyl - 4 - amino - 6 - [para - N - (diethyl α - glutarate) carbamidophenoxy]methylpteridine gives 2 - methyl - 4 - amino - 6 - [para - N-(α-glutaric acid)carbamidophenoxy]methylpteridine; 6 - [para - N(diethyl α - glutarate) carbamidophenoxy]methylpteridine gives 6 - [para-N - (α - glutaric acid)carbamidophenoxy]methylpteridine; 2 - methyl - 4 - hydroxy - 6 - [para-N - (diethyl α - glutarate) carbamidophenoxy]methylpteridine gives 2 - methyl - 4 - hydroxy - 6-[para - N - (α - glutaric acid)carbamidophenoxy]methylpteridine; 2 - chloro - 6 - [para - N-(diethyl α - glutarate) carbamidophenoxy]methylpteridine gives 2 - chloro - 6 - [para - N-(α-glutaric acid) carbamidophenoxy]methylpteridine; 2,4 - dihydroxy - 6 - [para - N - (diethyl α - glutarate) carbamidophenoxy]methylpteridine gives 2,4 - dihydroxy - 6[para - N - (α - glutaric acid) carbamidophenoxy]methylpteridine; 2-ethylmercapto - 4 - hydroxy - 6 - [para - N - (diethyl α - glutarate) - carbamidophenoxy]methylpteridine gives 2 - ethylmercapto - 4 - hydroxy-6 - [para - N - (α - glutaric acid) - carbamidophenoxy]methylpteridine; 2,4 - dimethyl - 6-[para - N - (diethyl α - glutarate)carbamidophenoxy]methylpteridine gives 2,4 - dimethyl-6 - [para - N - (α - glutaric acid)carbamidophenoxy]methylpteridine; 2 - chloro - 4 - ethyl - 6 [para - N - (diethyl α - glutarate)carbamidophenoxy]methylpteridine gives 2 - chloro - 4 - ethyl-6 - [para - N - (α - glutaric acid)carbamidophenoxy]methylpteridine; 2 - thio - 4 - hydroxy - 6-[para - N - (diethyl α - glutarate)carbamidophenoxy]methylpteridine gives 2 - thio - 4 - hydroxy-6 - [para - N - (α - glutaric acid)carbamidophenoxy]methylpteridine; 4 - methyl - 6 - [para - N-(diethyl α - glutarate)carbamidophenoxy]methylpteridine gives 4 - methyl - 6 - [para - N-(α-glutaric acid)carbamidophenoxy]methylpteridine; 2 - amino - 6 - [para - N - (diethyl - α - glutarate)carbamidophenoxy]methylpteridine gives 2 - amino - 6 - [para - N - (α - glutaric acid)carbamidophenoxy]methylpteridine; 2 - amino - 4-(p - aminostyryl) - 6 - [para - N - (diethyl α - glutarate)carbamidophenoxy]methylpteridine gives 2 - amino - 4 - (p - aminostyryl) - 6 - [para-N - (α - glutaric acid)carbamidophenoxy]methylpteridine; 2 - amino - 4 - chloro - 6 - [para - N-(diethyl α - glutarate)carbamidophenoxy]methylpteridine gives 2 - amino - 4 - chloro - 6 - [para-N - (α - glutaric acid)carbamidophenoxy]methylpteridine; and 2 - amino - 4 - methyl - 6 - [para-N - (diethyl α - glutarate)carbamidophenoxy]methylpteridine gives 2 - amino - 4 - methyl - 6-[para - N - (α - glutaric acid)carbamidophenoxy]methylpteridine.

When hydrolyzed in a like manner 2 - thio - 4-amino - 6 - [para - N - (diethyl α - glutarate)sulfonamidophenoxy]methylpteridine gives 2 - thio-4 - amino - 6 - [para - N - (α - glutaric acid)sulfonamidophenoxy]methylpteridine; 2,4 - diamino - 6 - [para - N - (diethyl α - glutarate)sulfonamidophenoxy]methylpteridine gives 2,4 - diamino - 6 - [para - N - (α - glutaric acid)sulfonamidophenoxy]methylpteridine; and 2,4 - dihydroxy - 6 - [para - N - (diethyl α - glutarate)sulfonamidophenoxy]methylpteridine gives 2,4 - dihydroxy - 6 - [para - N - (α - glutaric acid)sulfonamidophenoxy]methylpteridine.

*Example 5.* — N[4-{[(2,4-diamino-6-pyrimido-[4,5 - b] - pyrazyl)methyl]oxy}benzoyl] - L-glutamic acid, also designated as 2,4-diamino-6-[para - N - (α - glutaric acid)carbamidophenoxy]methylpteridine A solution of 6.28 grams of diethyl-p-(2-keto - 3,3 - diethoxypropoxy)benzoyl - L - glutamate and 2.96 grams of 2,4,5,6-tetraaminopyrimidine bisulfite in a mixture of 20 milliliters of ethanol and 40 milliliters of water was acidified to pH 3.0 with hydrochloric acid and heated to 85-90 degrees centigrade for four hours. A small residue was removed by centrifuging and the pH of the clear hot solution was adjusted to pH 3.2 by the addition of sodium carbonate and the solution cooled. The resulting precipitate of 2,4-diamino-6-[para-N-(α-glutaric acid)carbamidophenoxy]methylpteridine weighed 2.05 grams after collecting, washing with water and drying.

$E^{1\%}_{1cm.}]_{259\ m\mu} = 599$; $E^{1\%}_{1cm.}]_{364\ m\mu} = 166$ when observed in 0.1 normal sodium hydroxide solution. An additional 1.40 grams was obtained by cooling the filtrate above to 5 degrees centigrade for 24 hours and adjusting the pH to 4.0.

Having thus described our invention we claim:
1. A member of the group of 6-phenoxymethylpteridines represented by the formula:

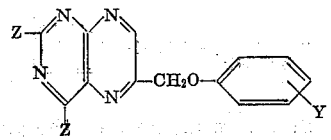

wherein each Z is a member of the group consisting of hydrogen, hydroxyl, thiol, alkylthiol, amino, halogen and alkyl and Y is a member of the group consisting of hydrogen, amino, nitro, halogen, alkyl, alkoxyl sulfonic acid, carboxylic acid and esters and amides of the sulfonic acid and carboxylic acid groups.

2. A 6-phenoxymethylpteridine represented by the formula:

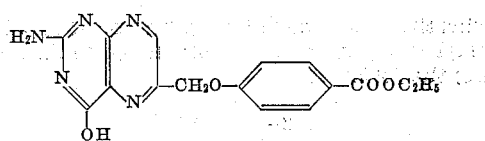

3. A 6-phenoxymethylpteridine represented by the formula:

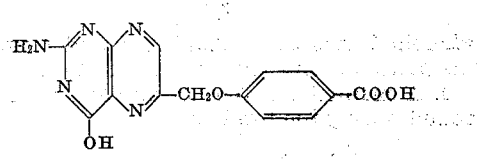

4. A 6-phenoxymethylpteridine represented by the formula:

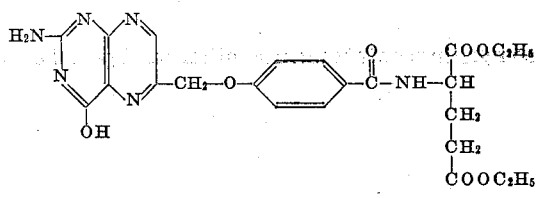

5. A 6-phenoxymethylpteridine represented by the formula:

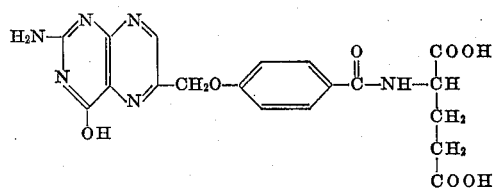

6. A 6-phenoxymethylpteridine represented by the formula.

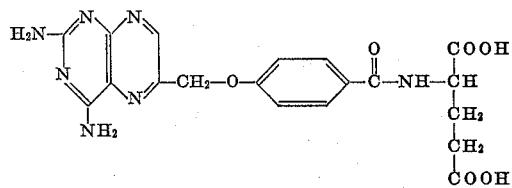

7. A method for the preparation of 6-phenoxymethylpteridines comprising contacting in solution a 4,5-diaminopyrimidine and a phenoxy-2-keto propionaldehyde acetal and isolating the pteridine thus produced from the reaction mixture.

8. A method for the preparation of 6-phenoxymethylpteridines represented by the formula:

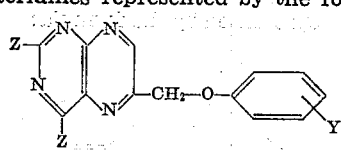

wherein each Z is a member of the group consisting of hydrogen, hydroxyl, thiol, alkylthiol, amino, halogen and alkyl and Y is a member of the group consisting of hydrogen, amino, nitro, halogen, alkyl, alkoxyl, sulfonic acid, carboxylic acid and esters and amides of the sulfonic acid and carboxylic acid groups comprising contacting in solution a compound having the formula:

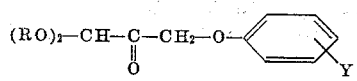

wherein Y has the values given and R is a lower alkyl group with a 4,5-diaminopyrimidine having the formula:

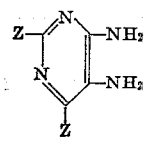

wherein Z has the values given and recovering the pteridine thus produced from the solution.

9. A method for the preparation of a compound having the formula:

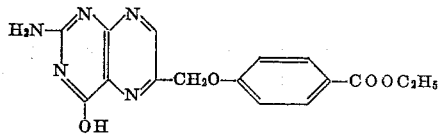

comprising contacting in solution ethyl p-(2-keto-3,3-diethoxypropoxy) benzoate and 2,4,5-triamino-6-hydroxypyrimidine and isolating the pteridine thus produced from the reaction mixture.

10. A method for the preparation of a pteridine having the formula:

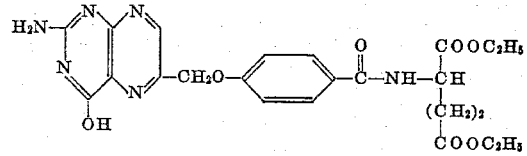

comprising contacting in solution diethyl p-(2-keto - 3,3 - diethoxypropoxy) - benzoyl - L-glutamate and 2,4,5-triamino-6-hydroxypyrimidine and isolating the pteridine thus produced from the reaction mixture.

11. A method for the preparation of a pteridine having the formula:

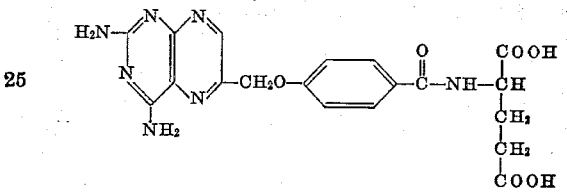

comprising contacting in solution ethyl-p-(2-keto-3,3-diethoxypropoxy) benzoate and 2,4,5,6-tetraaminopyrimidine and isolating the pteridine from the reaction mixture.

DAVID I. WEISBLAT.
BARNEY J. MAGERLEIN.

No references cited.